US009244510B1

(12) United States Patent
Conrad et al.

(10) Patent No.: US 9,244,510 B1
(45) Date of Patent: Jan. 26, 2016

(54) BUG REPORT CHECKS IN A MODELING SYSTEM

(75) Inventors: Mirko Conrad, Watertown, MA (US); Peter Szpak, Newton, MA (US); Thomas Joseph Erkkinen, Ann Arbor, MI (US); Xiaocang Lin, Sherborn, MA (US); David William Hoadley, Brighton, MI (US)

(73) Assignee: The MathWorks, Inc., Natick, MA (US)

( * ) Notice: Subject to any disclaimer, the term of this patent is extended or adjusted under 35 U.S.C. 154(b) by 568 days.

(21) Appl. No.: 13/242,936

(22) Filed: Sep. 23, 2011

(51) Int. Cl.
*G06F 9/44* (2006.01)
*G06F 1/30* (2006.01)
*G06F 11/07* (2006.01)

(52) U.S. Cl.
CPC .............. *G06F 1/30* (2013.01); *G06F 11/0766* (2013.01)

(58) Field of Classification Search
USPC .......................................................... 717/105
See application file for complete search history.

(56) References Cited

U.S. PATENT DOCUMENTS

| | | | | |
|---|---|---|---|---|
| 5,490,097 | A * | 2/1996 | Swenson et al. ................... 703/2 |
| 6,205,579 | B1 * | 3/2001 | Southgate ...................... 717/173 |
| 6,643,668 | B2 * | 11/2003 | Sluiman ......................... 717/104 |
| 7,149,928 | B2 * | 12/2006 | van Os ........................ 714/38.13 |
| 7,152,224 | B1 * | 12/2006 | Kaler et al. .................... 717/121 |
| 7,614,043 | B2 * | 11/2009 | Ognev et al. ................... 717/126 |
| 8,423,993 | B2 * | 4/2013 | Faus et al. ...................... 717/173 |
| 8,453,027 | B2 * | 5/2013 | Bartz et al. ..................... 714/746 |
| 8,707,111 | B2 * | 4/2014 | Ye et al. ............................ 714/57 |
| 2002/0178138 | A1 * | 11/2002 | Ender et al. ........................ 707/1 |
| 2002/0184133 | A1 * | 12/2002 | Zangari et al. ................... 705/36 |
| 2006/0074739 | A1 * | 4/2006 | King et al. ......................... 705/9 |
| 2006/0221364 | A1 * | 10/2006 | Iizuka ............................ 358/1.9 |
| 2007/0011659 | A1 * | 1/2007 | Venolia ......................... 717/127 |
| 2007/0234121 | A1 * | 10/2007 | He et al. ........................... 714/33 |
| 2008/0172583 | A1 * | 7/2008 | Mahajan et al. ................ 714/57 |
| 2009/0006883 | A1 * | 1/2009 | Zhang et al. ...................... 714/1 |
| 2011/0066908 | A1 * | 3/2011 | Bartz et al. ..................... 714/746 |
| 2011/0314438 | A1 * | 12/2011 | Surazski et al. ............. 717/100 |
| 2012/0023475 | A1 * | 1/2012 | Surazski et al. ............. 717/100 |

OTHER PUBLICATIONS

Fisher et al., "Analyzing and Relating Bug Report Data for Feature Tracking", IEEE, 2003.*
Swenson et al., "A Business Process Environment Supporting Collaborative Planning", The Journal of Collaborative Computing, vol. 1, No. 1, 1994.*
Runeson et al. "Detection of Duplicate Defect Reports Using Natural Language Processing", IEEE, 2007.*

* cited by examiner

*Primary Examiner* — Anna Deng
*Assistant Examiner* — Junchun Wu
(74) *Attorney, Agent, or Firm* — Harrity & Harrity, LLP

(57) ABSTRACT

A method may include storing bug reports in a memory, where a particular one of the bug reports describes a software bug and includes information about a modeling application. The method may further include receiving, from another computer device, a request for bug reports relevant to a model generated using the modeling application, where the request includes information about the model; identifying one or more relevant bug reports, in the stored bug reports, by comparing the information about the modeling application, included in the stored bug reports, with the information about the model, included in the received request; and providing information about the one or more relevant bug reports to the other computer device.

51 Claims, 12 Drawing Sheets

420

| 510-A | 520-A | 530-A | 540-A | 550-A | 560-A |
|---|---|---|---|---|---|
| BUG REPORT A | (INPUT TYPE I₁) AND (BLOCK D WITH FEEDBACK TO BLOCK C) | BLOCK C BLOCK D | | CAUSES A CRASH WITH INPUT TYPE I₁ IF MODEL INCLUDES BLOCK D WITH FEEDBACK TO BLOCK C | SEVERITY: HIGH |

501-A
•
•
•

| 510-B | 520-B | 530-B | 540-B | 550-B | 560-B |
|---|---|---|---|---|---|
| BUG REPORT B | | | | COMPILING MODEL WITH BLOCK A FOR HARDWARE X CAUSES SLOW PERFORMANCE | SEVERITY: LOW |

501-B
•
•
•

| 510-C | 520-C | 530-C | 540-C | 550-C | 560-C |
|---|---|---|---|---|---|
| BUG REPORT C | | BLOCK A | | FOR SOME PARAMETERS, MAY GENERATE WRONG RESULT | SEVERITY: LOW REPORTED BY N USERS |

BUG REPORT CHECKS IN A MODELING SYSTEM

BACKGROUND INFORMATION

A computer program may be associated with a bug. A bug may include an error, flaw, mistake, failure, fault, incompatibility, or another type of unintended result when the computer program is executed or performs a particular operation. A developer may use existing computer programs as building blocks when, for example, designing a model using a graphical block diagramming tool or generating complex code. Checking for, and identifying, bugs associated with existing computer programs may be time consuming, which may lengthen development times and may increase development costs associated with the programs.

BRIEF DESCRIPTION OF THE DRAWINGS

FIG. 10B is a diagram of example bug report records according to an implementation described herein;

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

An implementation described herein may relate to generating a check report of relevant bug reports for a particular graphical model created using a graphical modeling application. A bug report may refer to information associated with a particular software bug. A modeling system, such as, for example, a graphical modeling application, may request a check report from a bug reports system. An entity or a component of a model (e.g., a graphical model), generated using the modeling system, may be represented by a block. The request for a check report may include information about a particular model, such as, for example, information about blocks of the model and information about configuration settings associated with the model. The bug reports system may identify bug reports relevant to the model based on the information about the model included in the request and may generate a check report about the relevant bug reports. The relevant bug reports may be ranked based on criticality scores computed for each relevant bug report. The criticality scores may be based on information stored in the bug reports, on statistics associated with the bug reports, and on rules from a rule database that determine how the information and the statistics are to be used to determine the criticality scores.

Figure 1:
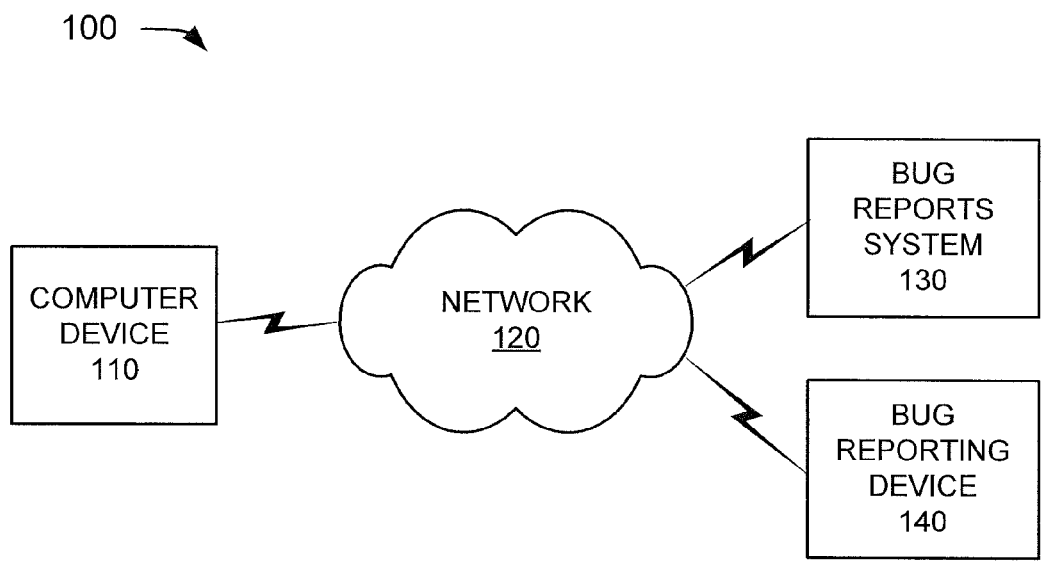
FIG. 1 is a diagram illustrating an example of components of an environment according to an implementation described herein.

FIG. 1 is a diagram of an example environment 100 according to an implementation described herein. As shown in FIG. 1, environment 100 may include a computer device 110, a network 120, a bug reports system 130, and a bug reporting device 140.

Computer device 110 may include one or more computer devices, such as a personal computer, a workstation, a server device, a blade server, a mainframe, a personal digital assistant (PDA), a laptop, a tablet, a smartphone, or another type of computation or communication device. Computer device 110 may request a check report for bug reports that are relevant to a model being designed using computer device 110 and may receive a check report from bug reports system 130. Furthermore, computer device 110 may provide information about a bug to bug reports system 130.

Network 120 may include one or more of: a packet-switched network, a circuit-switched network, or one or more packet-switched networks and/or circuit-switched networks of different types. For example, network 120 may include one or more of: a local area network (LAN), a wide area network (WAN), a metropolitan area network (MAN), an optical network, a cable television network, a satellite television network, a wireless access network (e.g., a Code Division Multiple Access (CDMA) network, a general packet radio service (GPRS) network, a Long Term Evolution (LTE) network, and/or another type of access network), an ad hoc network, a telephone network (e.g., the Public Switched Telephone Network (PSTN) or a cellular network), an intranet, the Internet, or a combination of these networks or other types of networks.

Bug reports system 130 may include one or more computer devices (e.g., server devices) that may receive information about a bug from computer device 110, bug reporting device 140, or another device; may generate a bug report based on the received information; and may store the generated bug report in a bug reports memory. Furthermore, bug reports system 130 may receive a request from computer device 110 for bug reports relevant to a model being designed using computer device 110 along with information about the model; may identify bug reports relevant to the model based on the received information; may generate criticality scores for the identified bug reports; and may provide a list of relevant bug reports, ranked based on the generated criticality scores, to computer device 110.

Bug reporting device 140 may include one or more computer devices, such as a personal computer, a workstation, a server device, a blade server, a mainframe, a personal digital assistant (PDA), a smartphone, a laptop, a tablet, or another type of computation or communication device. Bug reporting device 140 may provide information about a bug to bug reports system 130. In one example, bug reporting device 140 may include a user device. In another example, bug reporting device 140 may include a device associated with a user community, such as a message board, a wiki page, etc., associated with a particular modeling system or a bug reporting system associated with a particular software vendor. In yet another example, bug reporting device 140 may include a device associated with a software vendor that provides software components that may be used by computer device 110 to design a model. For example, bug reporting device 140 may provide a web service to computer device 110, where the web service allows computer device 110 to make use of a bug reporting service.

Although FIG. 1 shows example components of environment 100, in other implementations, environment 100 may include fewer components, different components, differently arranged components, and/or additional components than those depicted in FIG. 1. Alternatively, or additionally, one or more components of environment 100 may perform one or more tasks described as being performed by one or more other components of environment 100.

Figure 2:
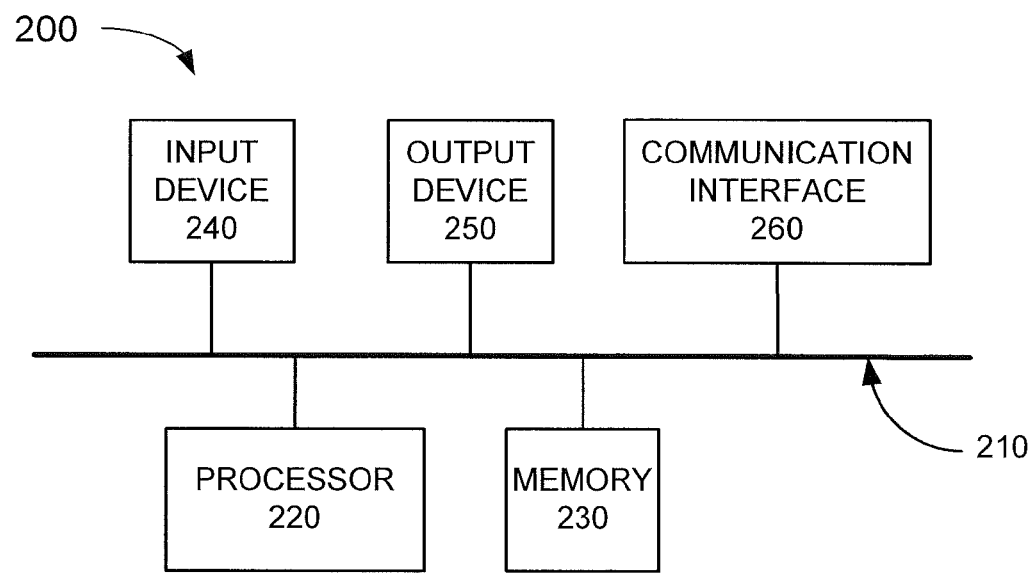
FIG. 2 is a diagram illustrating example components of the computer device of FIG. 1.

FIG. 2 is a diagram illustrating example components of computer device 200 according to a first implementation described herein. Device 200 may correspond to computer device 110, bug reports system 130, and/or bug reporting device 140. Alternatively, computer device 110, bug reports system 130, and/or bug reporting device 140 may include more than one device 200. As shown in FIG. 2, computer device 110 may include a bus 210, a processor 220, a memory 230, an input device 240, an output device 250, and a communication interface 260.

Bus 210 may include a path that permits communication among the components of device 200. Processor 220 may include one or more single-core and/or or multi-core processors, microprocessors, and/or processing logic (e.g., application specific integrated circuits (ASICs), field programmable gate arrays (FPGAs), ARM processors, etc.) that may interpret and execute instructions. Memory 230 may include a random access memory (RAM) device or another type of dynamic storage device that may store information and instructions for execution by processor 220, a read only memory (ROM) device or another type of static storage device that may store static information and instructions for use by processor 220, a magnetic and/or optical recording memory device and its corresponding drive, and/or a removable form of memory, such as a flash memory.

Input device 240 may include a mechanism that permits an operator to input information to device 200, such as a keypad, a keyboard, a button, or an input jack for an input device such as a keypad or a keyboard, a camera, an analog to digital (ADC) converter, a pulse-width modulation (PWD) input, etc. Output device 250 may include a mechanism that outputs information to the operator, including one or more light indicators, a display, a speaker, a digital to analog (DAC) converter, a PWM output, etc.

Communication interface 260 may include any transceiver-like mechanism that enables device 200 to communicate with other devices and/or systems. For example, communication interface 260 may include a modem, a network interface card, and/or a wireless interface card.

As will be described in detail below, device 200 may perform certain operations. Device 200 may perform these operations in response to processor 220 executing software instructions stored in a computer-readable medium, such as memory 230. A computer-readable medium may be defined as a non-transitory memory device. A memory device may include memory space within a single physical memory device or spread across multiple physical memory devices.

The software instructions may be read into memory 230 from another computer-readable medium, or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
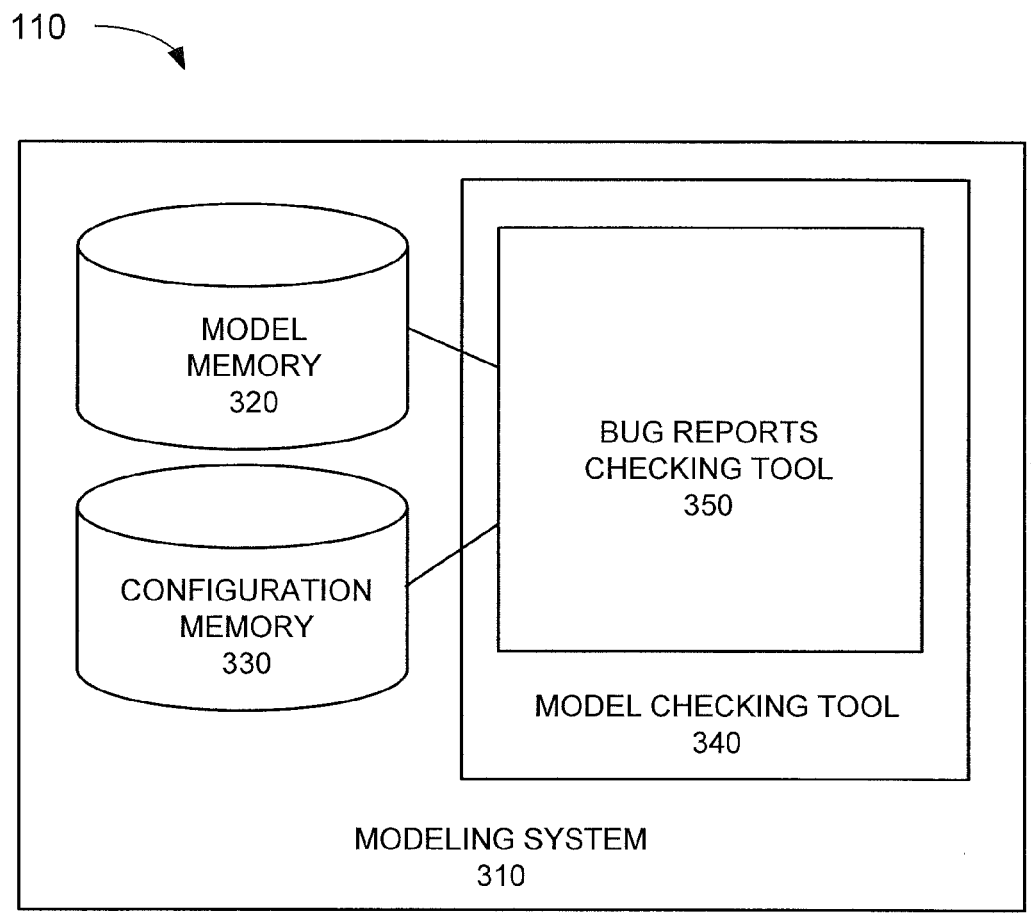
FIG. 3 is a diagram of example functional components of the computer device of FIG. 1.

FIG. 3 is a diagram of example functional components of computer device 110 according to an implementation described herein. The functional components of computer device 110 may be implemented as a result of processor 220 executing instructions from memory 230. As shown in FIG. 3, computer device 110 may include a modeling system 310. Modeling system 310 may include a development tool that enables existing software components to be used in the creation of a model and that may enable generation of executable code based on the model. For example, the development tool may include a graphical modeling tool or an application that provides a user interface for a numerical computing environment. Additionally, or alternatively, the development tool may include a graphical modeling tool and/or an application that provides a user interface for modeling and executing a dynamic system (e.g., based on differential equations, difference equations, algebraic equations, discrete events, discrete states, stochastic relations, etc.).

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems, and/or any other natural dynamic system. Man-made or engineered dynamic systems may include, for example, a bouncing ball, a spring with a mass tied on an end, automobiles, airplanes, control systems in major appliances, communication networks, audio signal processing systems, and a stock market, and/or any other man-made or engineered dynamic system.

The system represented by a model may have various execution semantics that may be represented in the model as a collection of modeling entities, often referred to as blocks. A block may generally refer to a portion of functionality that may be used in the model. The block may be graphically represented, however, it can be appreciated that the block may be represented textually or stored in some form of internal representation. Also, a particular visual depiction used to represent the block, for example in a graphical block diagram, may be an arbitrary design choice.

A block may be hierarchical in that the block itself may comprise one or more blocks that make up the block. A block comprising one or more blocks (sub-blocks) may be referred to as a subsystem block. A subsystem block may be configured to represent a subsystem of the overall system represented by the model.

Modeling system 310 may contain computer-executable instructions and data that are configured to perform various tasks. These tasks may include (1) constructing a model, for example, through a graphical user interface (GUI); (2) allowing an augmentation of a pre-defined set of blocks with custom user-specified blocks that may be associated with a model; (3) using a model to compute and trace a temporal evolution of outputs associated with a dynamic system represented by the model; (4) automatically producing, for example, deployable software systems, and descriptions of hardware systems that mimic a behavior of either an entire model or portions of a model; and/or (5) generating code and comments for a model.

Modeling system 310 may include an editor, code generator, and/or an execution engine. The editor may be configured to allow a user to, for example, specify, edit, annotate, save, print, and/or publish a model. The code generator may be configured to generate code (e.g., source code) based on the model. The execution engine may be configured to compile and link the generated code to produce an "in-memory executable" version of a model. The in-memory executable version of a model may be used, for example, to simulate, verify, trim, and/or linearize the model.

Modeling system 310 may implement a technical computing environment (TCE). A TCE may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Java, etc.

In one implementation, the TCE may include a dynamically typed language that can be used to express problems and/or solutions in mathematical notations familiar to those of skill in the relevant arts. For example, the TCE may use an array as a basic element, where the array may not require dimensioning. In addition, the TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

The TCE may further provide mathematical functions and/or graphical tools (e.g., for creating plots, surfaces, images, volumetric representations, etc.). In one implementation, the TCE may provide these functions and/or tools using toolboxes (e.g., toolboxes for signal processing, image processing, data plotting, parallel processing, etc.). In another implementation, the TCE may provide these functions as block sets. In still another implementation, the TCE may provide these functions in another way, such as via a library, etc. The TCE may be implemented as a text based environment, a graphically based environment, or another type of environment, such as a hybrid environment that is both text and graphically based.

The TCE may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

An alternative embodiment may implement a TCE in a graphically-based TCE using products such as, but not limited to, Simulink®, Stateflow®, SimEvents®, Simscape™, etc., by The MathWorks, Inc.; VisSim by Visual Solutions; LabView® by National Instruments; Dymola by Dassault Systèmes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) such as the Object Constraint Language (OCL) or SysML environment.

In yet another embodiment, the graphical model may use a human machine interface (HMI) design language, or the graphical model may be an architecture model such as, for example, a model based on an architecture description language (e.g., Architecture Analysis and Design Language (AADL)).

A further alternative embodiment may be implemented in a language that is compatible with a product that includes a TCE, such as one or more of the above identified text-based or graphically-based TCE's. For example, MATLAB (a text-based TCE) may use a first command to represent an array of data and a second command to transpose the array. Another product, that may or may not include a TCE, may be MATLAB-compatible and may be able to use the array command, the array transpose command, or other MATLAB commands. For example, the other product may use the MATLAB commands to perform model checking.

Yet another alternative embodiment may be implemented in a hybrid TCE that combines features of a text-based and graphically-based TCE. In one implementation, one TCE may operate on top of the other TCE. For example, a text-based TCE (e.g., MATLAB) may operate as a foundation and a graphically-based TCE (e.g., Simulink) may operate on top of MATLAB and may take advantage of text-based features (e.g., commands) to provide a user with a graphical user interface and graphical outputs (e.g., graphical displays for data, dashboards, etc.).

As shown in FIG. 3, modeling system 310 may include a model memory 320, a configuration memory 330, and a model checking tool 340. Model memory 320 may store information about particular models created using modeling system 310. For example, model memory 320 may store information about particular entities of a model, parameters associated with the particular entities, and/or relationships and connections between the particular entities.

Configuration memory 330 may store configuration information associated with particular models. For example, configuration memory 330 may store one or more data type specifications associated with a particular model, one or more optimization specifications associated with the particular model, one or more model simulation specifications associated with the particular model, one or more hardware implementations associated with the particular model, one or more code generation specifications associated with the particular model, and/or any other configuration specification that may be specified for a particular model.

Model checking tool 340 may include a tool to check a graphical model, or part of a graphical model, for conditions or configuration settings that may result in faulty, inaccurate, or inefficient performance of the graphical model. In one example, model checking tool 340 may analyze a model for software bugs. If model checking tool 340 detects a software bug associated with a model, model checking tool 340 may send a report about the detected bug to bug reports system 130. As illustrated, model checking tool 340 may include a bug reports checking tool 350.

Bug reports checking tool 350 may obtain information about a graphical model and provide the obtained information to bug reports system 130 along with a request for bug reports that are relevant to the graphical model. For example, bug reports checking tool 350 may obtain information about blocks of the graphical model and/or information about one or more configuration settings associated with the graphical model. Bug reports checking tool 350 may receive a check report from bug reports system 130 and may provide the check report to modeling system 310. The check report may include bug reports determined by bug reports system 130 to be relevant to the graphical model. The bug reports may be ranked based on criticality scores. Modeling system 130 may display information from the check report in a graphical interface via output device 250.

Although FIG. 3 shows example functional components of computer device 110, in other implementations, computer device 110 may include fewer functional components, different functional components, differently arranged functional components, or additional functional components than depicted in FIG. 3. Additionally or alternatively, one or more functional components of computer device 110 may perform one or more tasks described as being performed by one or more other functional components of computer device 110. For example, while in the example of FIG. 3 bug reports checking tool 350 has been described as part of model checking tool 340, in another example, bug reports checking tool 350 may be implemented independently of model checking tool 340. In other words, in another example, a user may activate bug reports checking tool 350 without activating model checking tool 340.

Figure 4:
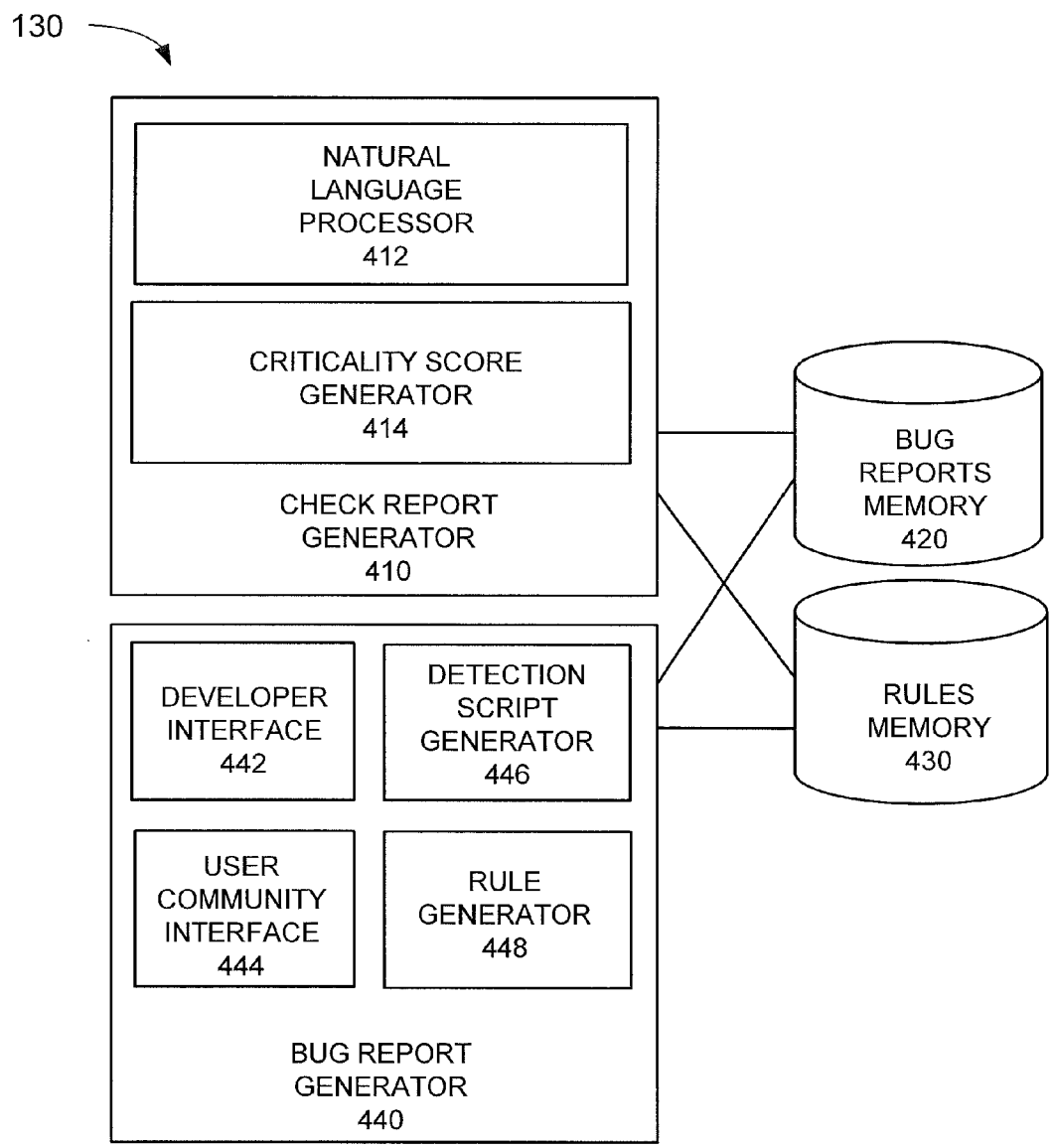
FIG. 4 is a diagram of example functional components of the bug report system of FIG. 1.

FIG. 4 is a diagram of example functional components of bug report system 130 according to an implementation described herein. The functional components of bug report system 130 may be implemented as a result of processor 220 executing instructions from memory 230. As shown in FIG. 4, bug report system 130 may include a check report generator 410, a bug reports memory 420, a rules memory 430, and a bug report generator 440.

Check report generator 410 may receive a request for bug reports relevant to a graphical model from computer device 110. Check report generator 410 may access bug reports memory 420 to identify bug reports relevant to the graphical model. Check report generator 410 may identify relevant bug reports by comparing information about the graphical model included in the received request with information stored in bug reports memory 420. For example, check report generator 410 may match information about blocks of the graphical model with information about blocks associated with particular bug reports in bug reports memory 420, and/or may match information about configuration settings of the graphical model with configuration settings associated with particular bug reports in bug reports memory 420. Check report generator 410 may generate a check report that includes information about the bug reports that were determined to be relevant to the graphical model.

Check report generator 410 may include a natural language processor 412 and a criticality score generator 414. Natural language processor 412 may analyze descriptions of bugs associated with bug reports stored in bug reports memory 420 to determine whether the bug reports are relevant to a particular model. For example, natural language processor 412 may parse a description of a bug to extract keywords and/or phrases and may match the extracted keywords and/or phrases with names and/or labels of particular blocks and/or particular configuration settings.

Natural language processor 412 may also analyze requests for relevant bug reports from computer device 110. For example, a user of modeling system 310 may desire to know whether there are any relevant bug reports associated with a particular keyword or phrase and may enter a textual query via modeling system 310 to natural language processor 412. For example, the user may query bug reports system 130 to look for bug reports relevant to the phrase "out of memory errors." Natural language processor 412 may access bug reports memory 420 to determine whether any bug reports stored in bug reports memory 420 match the keywords or phrases included in the textual query request.

Criticality score generator 414 may generate criticality scores for bug reports determined to be relevant to the graphical model. A criticality score may be a measure of how important a particular bug report is to the graphical model. Check report generator 410 may return a list of relevant bug reports ordered based on the criticality scores. For example, check report generator 410 may rank the relevant bug reports based on the criticality scores and may return a list of relevant bug reports ranked based on the criticality scores. Criticality score generator 414 is described in more detail below with reference to FIG. 6.

Bug reports memory 420 may store information about bug reports associated with blocks and/or configuration settings of modeling system 310. Example information that may be stored in bug reports memory 420 is described below with reference to FIG. 5.

Rules memory 430 may store one or more rules that may be used by criticality score generator 414 when generating criticality scores for bug reports. Rules memory 430 may enable a rule-based analysis to be used in selecting which bug reports satisfy certain criteria, such as relevance or importance criteria. Rules memory 430 may enable a rule-based analysis to be used in selecting bug reports that are more important than other bug reports. In one example, rules memory 430 may store one or more rules that relate statistics associated with particular bug reports to one or more thresholds. For example, a rule in rules memory 430 may state that when a bug, associated with a block, is reported by X % of users that include the block in a graphical model, then a bug report about the bug should be in included in a check report whenever a graphical model includes the block. As another example, a rule in rules memory 430 may state that a bug report about a bug should not be included in a check report unless the bug has been reported by at least Y users.

Bug report generator 440 may generate a bug report based on information received from computer device 110, from bug reporting device 140, or via input device 240 of bug report system 130. The information received about the bug may include blocks associated with the bug, configuration settings associated with the bug, a description of the bug and/or a situation that caused the bug to occur, etc. For example, a user of computer device 110 may report a bug that was detected by the user while using modeling system 310. As another example, a developer of code may report a bug associated with the code. As yet another example, a user may post information about a bug on a community message board and bug report generator 440 may obtain the information about the bug. As a further example, model checking tool 340 of computer device 110 may detect a bug associated with a model during a model checking process. Model checking tool 350 may automatically report the detected bug to bug reports system 130 and bug report generator 440 may generate a bug report based on the report received from model checking tool 350.

Bug report generator 440 may include a developer interface 442, a user community interface 444, a detection script generator 446, and a rule generator 448. Developer interface 442 may interact with developers of code and/or blocks associated with modeling system 310. For example, if bug reporting device 140 is associated with a developer of code and/or a block, associated with modeling system 310, developer interface 442 may receive information from the developer about a bug associated with the code and/or block.

User community interface 444 may allow bug report generator to interact with a user community, such as a message board associated with users of modeling system 310. For example, if bug reporting device 140 is associated with a message board, associated with modeling system 130, user community interface 444 may receive information from bug reporting device 140 about a bug associated with a block, and/or a configuration setting, associated with modeling system 130. For example, bug reporting device 140 may collect information about bugs reported by users and may provide the collected information to user community interface 444 at particular intervals. As another example, user community interface 444 may access the message board and scan messages posted on the message boards for tags and/or terms indicative of a software bug (e.g., terms such as "bug," "crash," "error," etc.) and may obtain information about reported bugs from the posted messages. As another example, user community interface 444 (or another component of bug report generator 440) may crawl web sites for content indicative of information about reported software bugs. Additionally, user community interface 444 may obtain information about statistics associated with particular bugs. For example, user community interface 444 may determine how many times a particular bug was reported, how many times the particular bug was reported associated with a particular configuration setting, etc.

Detection script generator 446 may generate a detection script for a bug report. A detection script may include one or more instructions to determine whether a bug report is relevant to a graphical model. For example, if a bug is reported to occur when block A and block B occur together in a graphical model with configuration setting C, the detection script for the bug may include instructions to check whether the graphical model includes block A, whether the graphical model includes block B, and whether the graphical model includes configuration setting C.

Rule generator 448 may generate rules for rule-based analysis of relevant bug reports. Rule-based analysis may apply one or more rules to a bug report to determine a criticality score associated with the bug report. In one example, a rule may specify how statistics associated with a bug report are to be used to determine a criticality score for the bug report. For example, a rule may state that a bug report is to be associated with a particular criticality score when the bug, associated with the bug report, has been reported by at least X different users. As another example, a rule may state that a bug report is to be associated with a particular criticality score when a bug, associated with the bug report, occurs in at least Y % of tested graphical models that include a block that causes the bug. As yet another example, a rule may relate a severity score associated with a bug report to a criticality score. For example, a bug that causes a crash of modeling system 310 may be associated with a high severity score, which may in turn result in a high criticality score for the bug report associated with the bug.

In another example, a rule may specify how a particular keyword or phrase, included in a description of a bug report, is to affect a criticality score of the bug report. For example, a rule may specify that if a description includes terms such as "crash," "freeze," or "kernel," then the criticality score of the bug report is to be increased.

Although FIG. 4 shows example functional components of bug report system 130, in other implementations, bug report system 130 may include fewer functional components, different functional components, differently arranged functional components, or additional functional components than depicted in FIG. 4. Additionally or alternatively, one or more functional components of bug report system 130 may perform one or more tasks described as being performed by one or more other functional components of bug report system 130.

Figure 5:
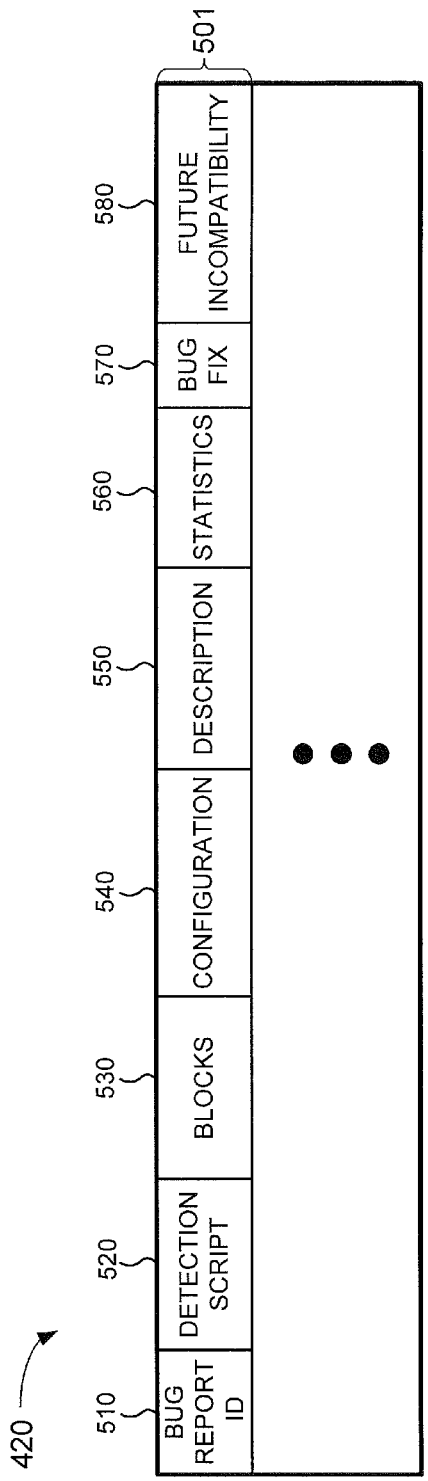
FIG. 5 is a diagram of example components of the bug reports memory of FIG. 4.

FIG. 5 is a diagram of example components of bug reports memory 420. As shown in FIG. 5, bug reports memory 420 may include one or more bug reports 501 (referred to herein collectively as "bug reports 501" and individually as "bug report 501"). Bug report 501 may store information associated with a particular bug. Bug report 501 may include a bug report identification (ID) field 510, a detection script field 520, a blocks field 530, a configuration field 540, a description field 550, a statistics field 560, a bug fix field 570, and a future incompatibility field 580.

Bug report identification (ID) field 510 may store a string that uniquely identifies a particular bug. Detection script field 520 may include one or more instructions to check whether a bug report is relevant to a graphical model.

Blocks field 530 may store information about one or more blocks associated with the particular bug. For example, blocks field 530 may store information identifying one or more particular blocks, one or more particular combinations of blocks, one or more particular connections between blocks, a data type associated with a particular block or a particular combination of blocks, an input and/or output type associated with a particular block or a particular combination of blocks, and/or any other parameter associated with a particular block or a particular combination of blocks.

Configuration field 540 may store information about one or more configuration settings associated with the particular bug. For example, configuration field 540 may store information about an application version associated with the particular bug, data type specification associated with the particular bug, an optimization specification associated with the particular bug, a model simulation specification associated with the particular bug, a hardware implementation specification associated with the particular bug, a code generation specification associated with the particular bug, and/or any other configuration setting associated with the particular bug or combinations thereof.

Description field 550 may store a description of the particular bug. For example, when a user reports a bug, the user may provide a verbal description that describes the situation that caused the bug to occur and/or what effect the bug had on a graphical model or modeling system 310.

Statistics field 560 may store information about statistics associated with the particular bug. For example, statistics field 560 may include information about a total number of times that the bug has been reported by users, a number of times the bug has been reported by users in connection with a particular condition, a frequency of occurrence associated with the bug, a frequency of occurrence associated with the bug in connection with a particular condition, a probability of occurrence associated with the bug, a probability of occurrence associated with the bug in connection with a particular condition, and/or any other statistic associated with the particular bug that may be useful in determining the importance of the bug and/or the relevance of the bug to a particular graphical model.

Statistics field 560 may also include a severity rating associated with the particular bug. For example, if the particular bug causes a kernel crash, which may be a severe problem, the particular bug may be associated with a high severity rating. As another example, if the particular bug slows down system performance, which may be a less severe problem, the particular bug may be associated with a low severity rating.

Bug fix field 570 may include information about one or more fixes that may be available for the particular bug. For example, bug fix field 570 may include a description of an available fix and/or may store an address to a location that includes executable code associated with the available fix. As another example, bug fix field 570 may include instructions to provide an option to disallow modeling system 310 from causing the particular bug to occur. For example, if the particular bug occurs if block A is connected to block B, bug fix field 570 may provide an option to configure modeling system 310 to disallow a connection between block A and block B. As yet another example, bug fix field 570 may include instructions to provide an option to disallow generation of code that would be affected by the particular bug. Thus, applying the fix to a model may allow modeling system 310 to work around the particular bug in order to eliminate or minimize undesirable effects associated with the particular bug in a model.

Future incompatibility field 580 may include information about future incompatibilities associated with blocks identified in blocks field 530. For example, if a particular block identified in blocks field 530 will not be available in a future version of modeling system 310, future incompatibility field 580 may include instructions to inform of the future incompatibility and may include instructions to provide an option to disallow modeling system 310 from including the particular block in a graphical model.

Although FIG. 5 shows example components of bug reports memory 420, in other implementations, bug reports memory 420 may include fewer components, different components, differently arranged components, or additional components than depicted in FIG. 5. For example, bug reports memory 420 may include a subscribed users field that identifies one or more users that discovered the particular bug, selected a 'like' button associated with the bug, and/or indicated an interest to follow developments associated with the bug (e.g., by selecting a 'subscribe' button associated with the bug). A user may be able to select a 'like' or 'subscribe; button when, for example, viewing a bug report associated with the bug in a check report received by the user via a modeling application.

Figure 6:
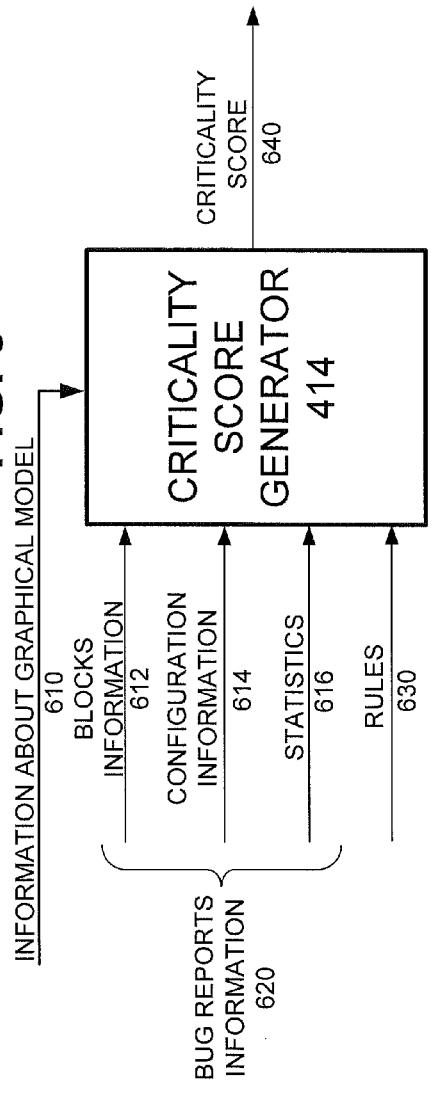
FIG. 6 is a diagram of example inputs of the criticality score generator of FIG. 4.

FIG. 6 is a diagram of example inputs of criticality score generator 414. As shown in FIG. 6, criticality score generator 414 may generate a criticality score 640 for a bug report in relation to a particular graphical model and in relation to rules stored in rules memory 430. Criticality score generator 414 may receive information about graphical model input 610, a bug reports information input 620, and a rules input 630.

Information about graphical model input 610 may include information received from computer device 110 about a graphical model in connection with a request for bug reports relevant to the graphical model. For example, information about graphical model input 610 may include information about blocks of the graphical model and/or information about configuration settings associated with the graphical model.

Bug reports information input 620 may include information about bug reports stored in bug reports memory 420. Bug reports information input 620 may include a blocks information input 612, a configuration information input 614, and a statistics input 616. Blocks information input 612 may include information from blocks field 530 of bug reports 501 stored in bug reports memory 420. Configuration information input 614 may include information from configuration field 540 of bug reports 501 stored in bug reports memory 420. Statistics input 616 may include information from statistics field 560 of bug reports 501 stored in bug reports memory 420. Rules input 630 may include information about rules, stored in rules memory 430, that are to be applied when determining criticality score 640 for bug reports in response to receiving a request for bug reports relevant to the graphical model.

Criticality score generator 414 may compare the information about the graphical model with the bug reports information to identify bug reports that match the information about the graphical model. Criticality score generator 414 may further apply the rules from rules memory 430 to the bug reports information (such as the statistics information) to generate criticality score 640 for bug report records 501, stored in bug reports memory 420, in relation to the graphical model and in relation to the rules stored in rules memory 430.

Although FIG. 6 shows example inputs of criticality score generator 414, in other implementations, criticality score generator 414 may include fewer inputs, different inputs, differently arranged inputs, or additional inputs than depicted in FIG. 6.

Figure 7:
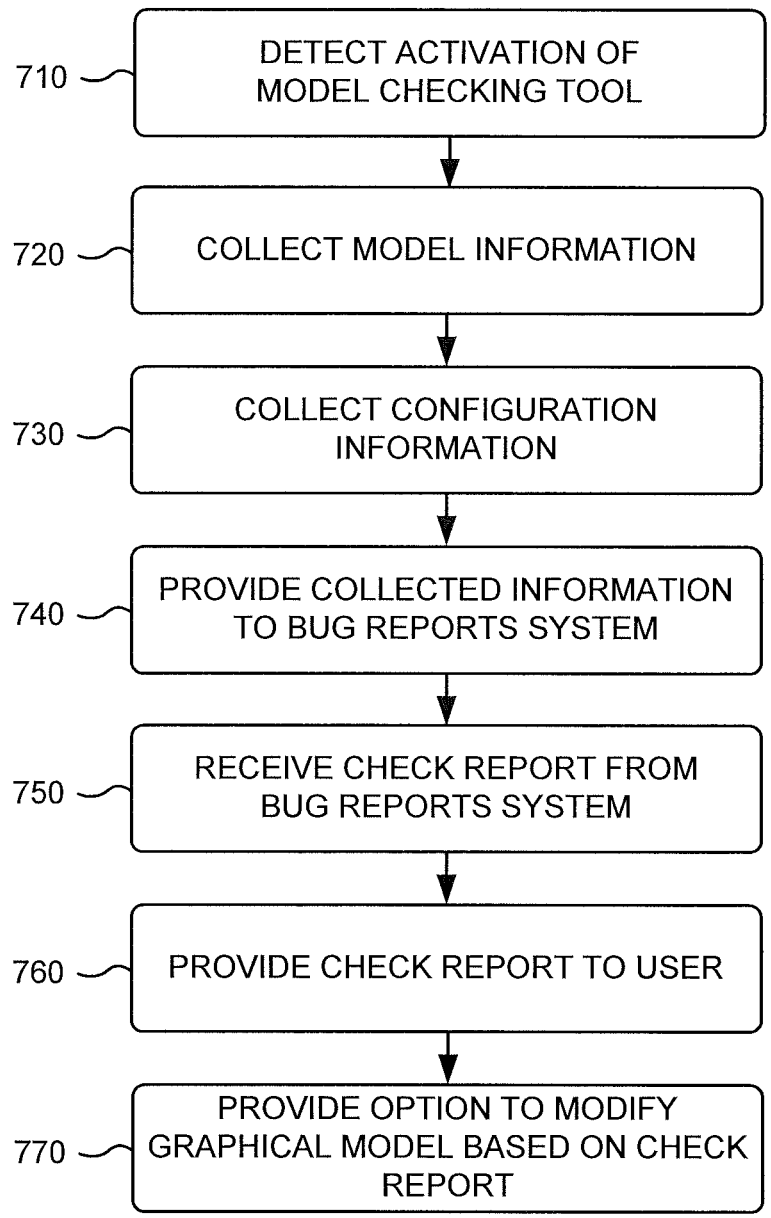
FIG. 7 is a flow diagram of an example process for receiving a check report according to an implementation described herein.

FIG. 7 is a flow diagram of an example process for receiving a check report according to an implementation described herein. In one implementation, the process of FIG. 7 may be performed by computer device 110. In other implementations, some or all of the process of FIG. 7 may be performed by another device or a group of devices separate from and/or possibly remote from computer device 110 and/or including computer device 110.

The process of FIG. 7 may include detecting activation of a model checking tool (act 710). For example, a user of modeling system 310 may activate model checking tool 340 to check a graphical model for conditions or configuration settings that may result in undesired, faulty, inaccurate, incompatible, and/or inefficient performance of the graphical model.

In one example, model checking tool 340 may automatically check the model for software bugs. If model checking tool 340 detects a software bug associated with the model, model checking tool 340 may report the detected bug to bug reports system 130. In another example, model checking tool 340 may activate a remote code analysis tool (e.g., Polyspace). The remote code analysis tool may analyze code, associated with a model, for possible errors, such as, for example, arithmetic overflow, buffer overrun, division by zero, etc. If the remote code analysis tool detects a bug, the remote code analysis tool may report the detected bugs to bug reports system 130. Furthermore, model checking tool 340 may inform the user about any detected bugs. In one example, model checking tool 340 may provide the information to the user associated with the model for a fee.

Model checking tool 340 may activate bug reports checking tool 350. In one example, model checking tool 340 may activate bug reports checking tool 350 automatically. In another example, model checking tool 340 may provide an option to the user to activate bug reports checking tool 350. In response to being activated, bug reports checking tool 350 may initiate a process to request a check report of bug reports relevant to the graphical model from bug reports system 130.

Model information may be collected (act 720). For example, bug reports checking tool 350 may collect information about blocks included in the graphical model, information about connections between the blocks, information about data types associated with the blocks, information about input and/or output types associated with the blocks, and/or any other types of parameters associated with the blocks.

Configuration information may be collected (act 730). For example, bug reports checking tool 350 may collect information about an application version associated with the graphical model, a data type specification associated with the graphical model, an optimization specification associated with the graphical model, a model simulation specification associated with the graphical model, a hardware implementation specification associated with the graphical model, a code generation specification associated with the graphical model, and/or other types of configuration settings associated with the graphical model.

The collected information may be provided to a bug reports system (act 740). For example, computer device 110 may send a request for a check report, of bug reports relevant to the graphical model, to bug reports system 130. The request may include the collected model and configuration information about the graphical model.

A check report may be received from the bug reports system (act 750). For example, computer device 110 may receive a check report from bug reports system 130. The check report may include one or more bug reports. The bug reports may be ranked based on the relevance of the particular bug reports, included in the check report, to the graphical model.

The check report may be provided to the user (act 760). For example, bug reports checking tool 350 may display the check report in a window associated with the graphical model. An option may be provided to modify the graphical model based on the check report (act 770). For example, bug reports checking tool 350 may provide the user with one or more options to modify the graphical model based on the check report. As an example, the check report may include information about an available fix for a bug report included in the check report. Bug reports checking tool 350 may provide the user with an option to implement the fix into the graphical model.

As another example, the bug report checking tool 350 may provide the user with an option to disallow the graphical model from causing a particular bug to occur. For example, if the check report includes a bug report about a bug that causes modeling system 310 to crash if a particular combination of blocks is included in the graphical model, bug reports checking tool 350 may provide the user with an option to disallow the particular combination of blocks from being included in the graphical model. In one example, disallowing a particular combination may be achieved by checking a model and producing an error when the combination exist. In another example, disallowing a particular combination may include including an editing option in a graphical model editor, which, when enabled, would result in the particular combination being disabled. As yet another example, bug reports checking tool 350 may provide the user with an option to prevent generation of any intellectual property affected by a particular bug. For example, bug reports checking tool 350 may provide the user with an option to prevent generation of code based on a graphical model that includes a particular bug.

Figure 8:
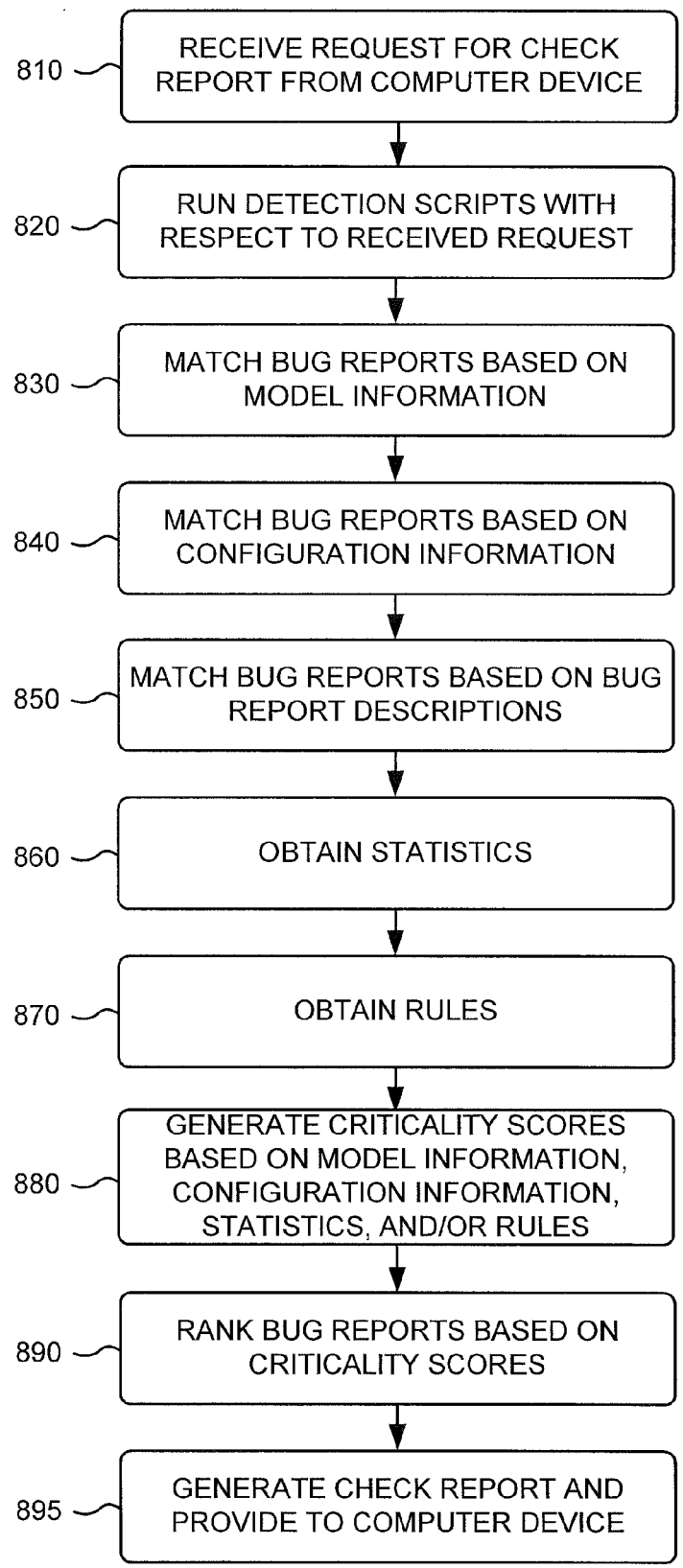
FIG. 8 is a flow diagram of an example process for generating a check report according to an implementation described herein.

FIG. 8 is a flow diagram of an example process for generating a check report according to an implementation described herein. In one implementation, the process of FIG. 8 may be performed by bug report system 130. In other implementations, some or all of the process of FIG. 8 may be performed by another device or a group of devices separate from and/or possibly remote from bug report system 130 and/or including bug report system 130.

The process of FIG. 8 may include receiving a request for a check report from a computer device (act 810). For example, check report generator 410 may receive a request for a check report of relevant bug reports from computer device 110. The request may include information about a graphical model, such as information about one or more blocks of the graphical model and/or information about one or more configuration settings of the graphical model.

Detection scripts may be run with respect to the received request (act 820). A bug report stored in bug reports database 420 may or may not have an associated detection script. A detection script, associated with a bug report, may include one or more instructions that may enable check report generator 410 to efficiently determine whether a graphical model is relevant to the bug report. For example, a detection script may include an instruction to check whether a graphical model includes a particular block or combination of blocks, a parameter associated with a particular block or a combination of blocks, a particular relation between blocks, a particular configuration setting, etc.

For bug reports that do not have an associated detection script, check report generator 410 may match the information included in the received request with information stored in bug report records 501 stored in bug reports memory 420. Bug reports may be matched based on model information (act 830) and bug reports may be matched based on configuration information (act 840). For example, check report generator 410 may match the information about the blocks of the graphical model, included in the request received from computer device 110, with information stored in blocks field 530 of bug report records 501 stored in bug reports memory 420. Similarly, check report generator 410 may match the information about configuration settings associated with the graphical model, included in the request received from computer device 110, with information stored in configuration field 540 of bug report records 501 stored in bug reports memory 420.

Additionally or alternatively, bug reports may be matched based on bug report descriptions (act 850). For example, natural language processor 412 may extract keywords or phrases from description field 550 of bug report records 501 stored in bug reports memory 420. The extracted keywords or phrases may be compared with keywords or phrases associated with particular blocks or configuration settings associated with the graphical model. For example, each block or configuration setting may be tagged with one or more keywords or phrases, which may be compared to the extracted keywords or phrases. In one example, natural language processor 412 may extract the keywords or phrases from description field 550 of bug report records 501 ahead of time and store the extracted keywords or phrases in description field 550 (or in another location). In another example, keywords and/or tags may be explicitly provided by the user. In yet another example, natural language processor 412 may extract the keywords or phrases in response to receiving the request for a check report from computer device 110.

Statistics may be obtained (act 860). For example, check report generator 410 may access statistics field 560 of bug report records 501 which have been determined to match the graphical model based on the information included in the received request. Rules may be obtained (act 870). For example, check report generator 410 may access rules memory 430 to obtain any applicable rules.

Criticality scores may be generated based on model information, configuration information, statistics, and/or rules (act 880). For example, criticality score generator 414 may generate criticality scores for bug report records 501 which have been determined to match the graphical model based on model information and configuration information associated with the bug reports, based on the obtained statistics associated with the bug reports, and/or based on the obtained rules.

For example, statistics associated with the bug reports may include severity ratings and a rule may state that a higher severity rating should result in a higher criticality rating. Thus, more serious bugs may be designated as more critical. As another example, statistics associated with the bug reports may include information about a number of times a bug has been reported by users and a rule may state that bug reports that have been reported a higher number of times should result in a higher criticality rating. Additionally or alternatively, a rule may state that a bug should have an L (e.g., to indicate 'low') criticality score unless the bug has been reported by at least a certain minimum number of different users.

As yet another example, a rule may state that bugs that occur in connection with a first hardware implementation configuration setting should have a higher criticality score than bugs that occur with a second hardware implementation configuration setting. As yet another example, a rule may state that a bug associated with a single block should have a higher criticality score than a bug that is associated with a particular combination of multiple blocks. As yet another example, assuming that a software developer or model developer may be more trusted than a user, a rule may state that a bug reported by a software developer or model developer may be associated with a higher criticality score than a bug reported by a software or model user. In one example, the calculated criticality scores may be provided to the user. For example, a check report may display a calculated criticality score in connection with a particular bug report.

Bug reports may be ranked based on criticality scores (act 890). For example, check report generator 410 may rank the bug report records 501 that have been determined to match the graphical model based on the generated criticality scores. For example, a bug report with the highest criticality score may be ranked as first, a bug report with a second highest criticality score may be ranked as second, etc.

A check report may be generated and provided to the computer device (act 895). For example, check report generator 410 may generate a ranked list of bug reports relevant to the graphical model. Additionally, check report generator 410 may include farther information and/or instructions in the generated check report. For example, check report generator 410 may include information about a fix associated with a particular bug report in the check report and/or instructions to provide an option to the user to include the fix in the graphical model; may include information about future incompatibilities associated with the graphical model; may include instructions to provide an option to disallow the graphical model from causing a particular bug to occur; may provide an option to prevent generation of any intellectual property affected by a particular bug; and/or may provide other options to modify the graphical model based on information included in the check report.

Additionally, the received check report may be incorporated into documentation associated with the graphical model. The documented check report may provide evidence that a check for known bugs has been performed for the graphical model and/or may provide evidence that code generated based on the graphical model is free of any known bugs.

Figure 9:
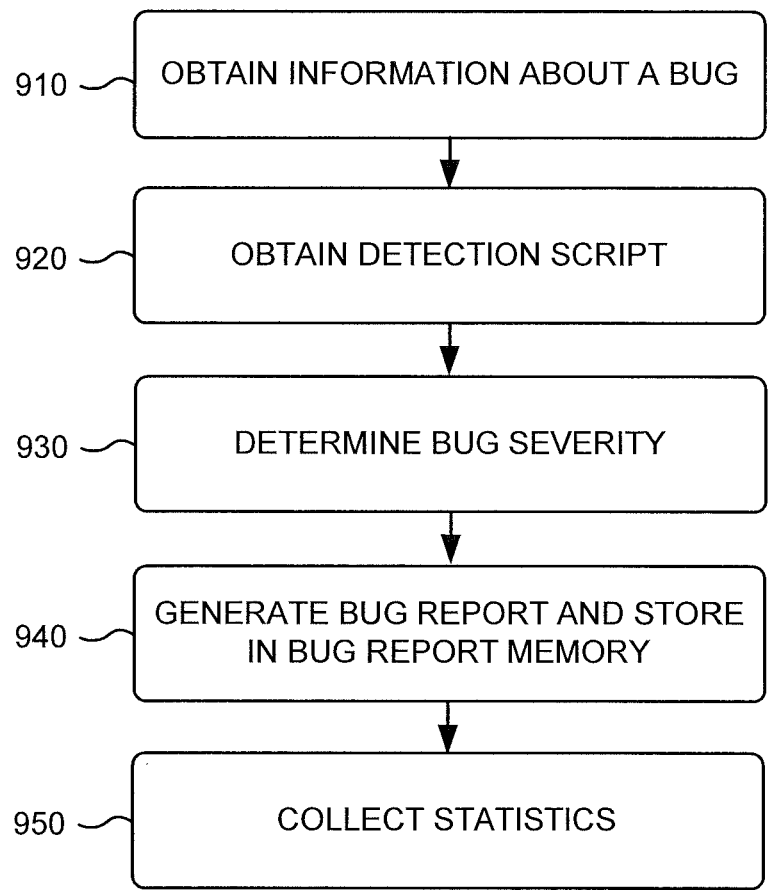
FIG. 9 is a flow diagram of an example process for storing a bug report according to an implementation described herein.

FIG. 9 is a flow diagram of an example process for storing a bug report according to an implementation described herein. In one implementation, the process of FIG. 9 may be performed by bug report system 130. In other implementations, some or all of the process of FIG. 9 may be performed by another device or a group of devices separate from and/or possibly remote from bug report system 130 and/or including bug report system 130.

The process of FIG. 9 may include obtaining information about a bug (act 910). In one example, an administrator associated with modeling system 310 may manually enter information about a bug into bug reports memory 420 by generating a new bug report record 501. In another example, a user may report a discovered bug via modeling system 310 or a message board. In yet another example, a developer of code or a block available via modeling system 310 may report a bug to bug reports system 310 using bug reporting device 140. As a further example, model checking tool 340 may detect a bug on computer system 110 and may automatically report the detected bug to bug reports system 130. As a still further example, a bug may be detected by a remote code analysis tool (e.g., Polyspace) that checks code associated with a model on computer device 110. The remote code analysis tool may be activated, for example, during operation of model checking tool 340.

In yet another example, bug reporting device 140 may correspond to a device associated with a user community, such as a message board, and bug reports system 310 may scan information stored in bug reporting device 140 at periodic intervals to identify information about discovered bugs. For example, bug reports system 310 may scan stored information (e.g., message board posts) for tags and/or terms indicative of a software bug (e.g., terms such as "bug," "crash," "error," etc.) to identify information about bugs discovered by users. In one example, bug reports system 310 may extract information about bugs from the identified information and may generate bug report records 501 based on the extracted information. In another example, bug reports system 310 may flag the identified information for manual review. An administrator may review the identified information and manually generate bug report records 501 based on the identified information.

In yet another example, bug reporting device 140 may correspond to a search engine that periodically searches the Internet (or another network) for bugs that have been reported by users and/or developers in connection with modeling system 310. Bug reporting device 140 may crawl documents to search for tags and/or terms indicative of a software bug to identify documents that include information about discovered bugs. Additionally or alternatively, bug reporting device 140 may submit search queries that include terms indicative of a software bug to another search engine.

The information obtained about the bug may include information about blocks associated with the bug, information about configuration settings associated with the bug, a description of the bug, statistics associated with the bug, a severity rating for the bug, and/or any other information about the bug.

A detection script may be obtained (act 920). In one example, a detection script may be received in connection with the information about the bug. For example, a developer that discovered a bug may generate a detection script for the bug and provide the detection script to bug reports system 310. In another example, detection script generator 446 may generate a detection script for the bug based on the obtained information. For example, if the obtained information includes information about blocks associated with the bug, detection script generator 446 may generate an instruction to check whether a graphical model includes the blocks.

A severity of the bug may be determined (act 930). A severity associated with the bug may be an indication of how serious effects of the bugs may be. For example, a bug that causes a kernel crash may be associated with a high severity and a bug associated with slowing down performance of modeling system 310 may be associated with a low severity. In one example, a severity associated with the bug may be received in connection with the information about the bug. For example, a user that reported the bug may indicate a severity rating for the bug. In another example, bug report generator 440 may determine a severity rating for the bug by analyzing the obtained information about the bug. For example, bug report generator 440 may invoke natural language processor 412 to analyze a description of a bug to determine the severity rating. Bug report generator 440 may include a list of keywords or phrases associated with particular severity ratings and may match keywords or phrases extracted from the description to a particular severity rating for the bug.

A bug report may be generated and stored in bug reports memory (act 940). For example, bug report generator 440 may generate a new bug report record 501 based on the obtained information and store the new bug report record 501 in bug reports memory 420.

Statistics may be collected (act 950). For example, bug report generator 440 may collect statistics associated with the bug, such as a number of times the bug has been reported by users, a frequency of occurrence of the bug, and/or a probability of occurrence of the bug. Bug report generator 440 may collect information from modeling system 310 at particular intervals. For example, modeling system 310 may keep a bug log file on computer device 110 about any bugs experienced during operation of modeling system 310. When a user activates model checking tool 340, model checking tool 340 may send information about a graphical model to bug report generator 440, along with information from the bug log file.

Figure 10A:
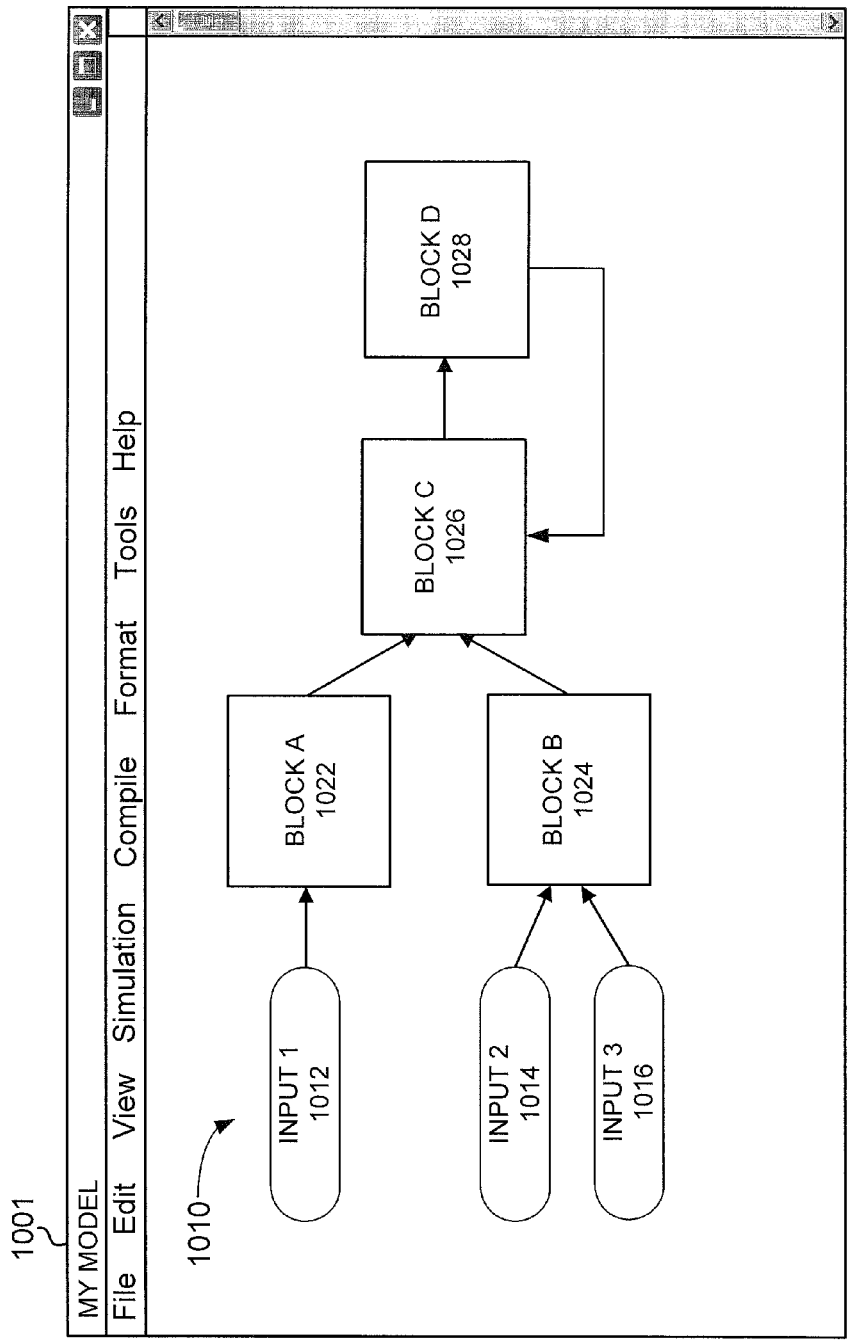
FIG. 10A is a diagram of an example user interface of a graphical modeling tool according to an implementation described herein.

FIG. 10A is a diagram of an example user interface 1001 of a modeling system 310 according to an implementation described herein. User interface 1001 may correspond to a user interface for a graphical modeling application that enables a user to simulate dynamic systems via graphical blocks and relationships specified between the graphical blocks. As shown in FIG. 10A, user interface 1001 may include a graphical model 1010. A compiling tool associated with the graphical modeling application may process a model to generate code where the generated code is based on graphical model 1010 created by the user. The processing of the model may determine an order in which to execute the blocks in the model, the data types of variables in the model, the dimensions of variables in the model, etc. The generated code may be executed by computer device 110 when the model is executed. The generated code, for which a check report regarding relevant bugs has been requested, may be stored in a storage device for subsequent use by the modeling application or for subsequent use by another device.

As shown in FIG. 10A, graphical model 1010 includes an 'input 1' block 1012, an 'input 2' block 1014, an 'input 3' block 1016, a 'block A' block 1022 connected to 'input 1' block 1012, a 'block B' block 1024 connected to 'input 2' block 1014 and 'input 3' block 1016, a 'block C' block 1026 connected to 'block A' block 1022 and 'block B' block 1024, and a 'block D' block 1028 connected to 'block C' block 1026 with feedback to 'block C' block 1026. Further, assume that graphical model 1010 is associated with a hardware implementation configuration, which optimizes code generated based on graphical model 1010, for specific hardware 'X'.

When a user activates bug reports checking tool 350 to identify bugs relevant to graphical model 1010, bug reports checking tool 350 may send a request for a check report to bug reports system 130. The request may include information about graphical model 1010, such as information about the blocks and configuration settings associated with graphical model 1010.

FIG. 10B is a diagram of example bug report records according to an implementation described herein. Assume bug reports memory 420 includes bug reports 501-A, 501-B, and 501-C. When check report generator 410 receives the request from computer device 110, check report generator 410 may identify bug reports 501-A, 501-B, and 501-C as relevant to graphical model 1010. Bug report 501-A may be identified by running detection script 520-A, which checks whether graphical model 1010 includes input type $I_1$ and whether block D provides feedback to block C. Bug report 501-C may be identified as relevant to graphical model 1010 by matching the information stored in blocks field 530-C to information received about the graphical model 1010.

Bug report 501-B may not include a detection script and may not include any information in blocks field 530-B or configuration field 540-B. Nevertheless, bug report 501-B may be identified as relevant to graphical model 1010 based on analyzing description 550-B using natural language processor 412. Natural language processor 412 may match the terms "block A" and "hardware X" to graphical model 1010.

Criticality score generator 414 may generate criticality scores for bug reports 501-A, 501-B, and 501-C and check report generator 410 may generate a check report that includes bug reports 501-A, 501-B, and 501-C ranked based on the generated criticality scores. For example, bug report 501-A may have the highest criticality score and may be ranked first because bug report 501-A is about a serious bug that causes a system crash, and thus has a high severity rating. A rule from rule memory 430 may state that any bug reports that cause a crash should have a high criticality score. For example, the rule may state that if a bug report includes a severity rating associated with a system crash, or if a bug report includes the term "crash" in the description, then the criticality score should be incremented by and/or changed to a particular value.

Bug reports 510-B and 510-C may both be associated with a low severity rating, yet bug report 510-C may be ranked higher than bug report 510-B based on statistics. For example, bug report 510-C may include a statistic that states that bug report 510-C has been reported by N users and a rule in rules memory 430 may state that if a bug has been reported by at least M users (where N>M), then the criticality score should be incremented by and/or changed to a particular value.

Additionally, a fix may be available for bug report 510-C and the check report may include instructions for installing the fix. Furthermore, as bug report 510-A is associated with a serious bug, the check report may include instructions to provide an option to disallow the combination of blocks that causes the bug.

Check report generator 414 may send the check report to computer device 110.

Figure 10C:
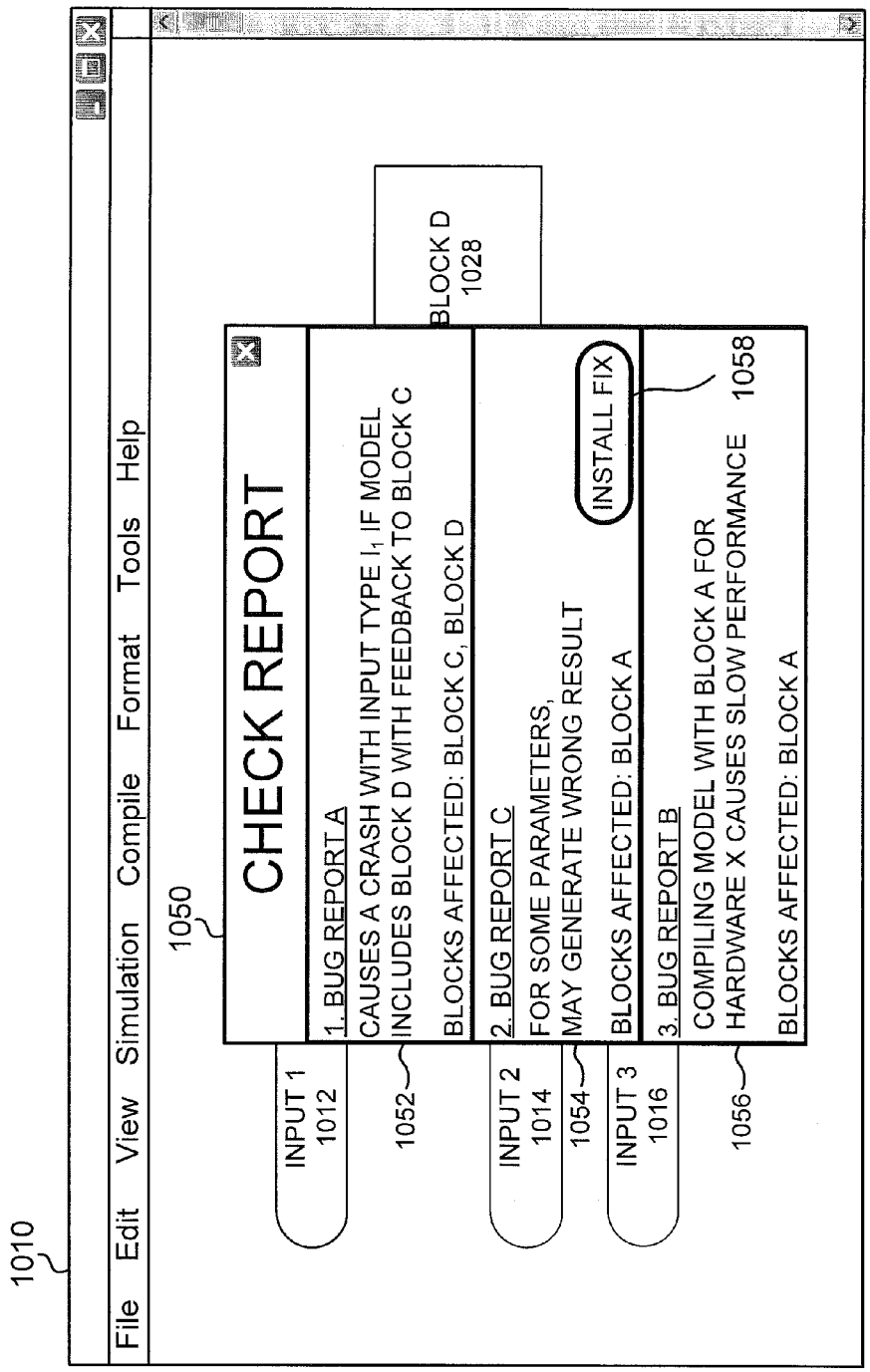
FIG. 10C is a diagram of a first example user interface for presenting a check report according to an implementation described herein.

FIG. 10C is a diagram of example user interface 1001 that may be used after presenting check report 1050, which has been received from bug reports system 130. Check report 1050 may include information about the bugs identified as relevant to graphical model 1010, ranked based on the generated criticality scores. Furthermore, check report 1050 may include a selection tool 1058 to install a fix for the bug associated with bug report C.

Figure 10D:
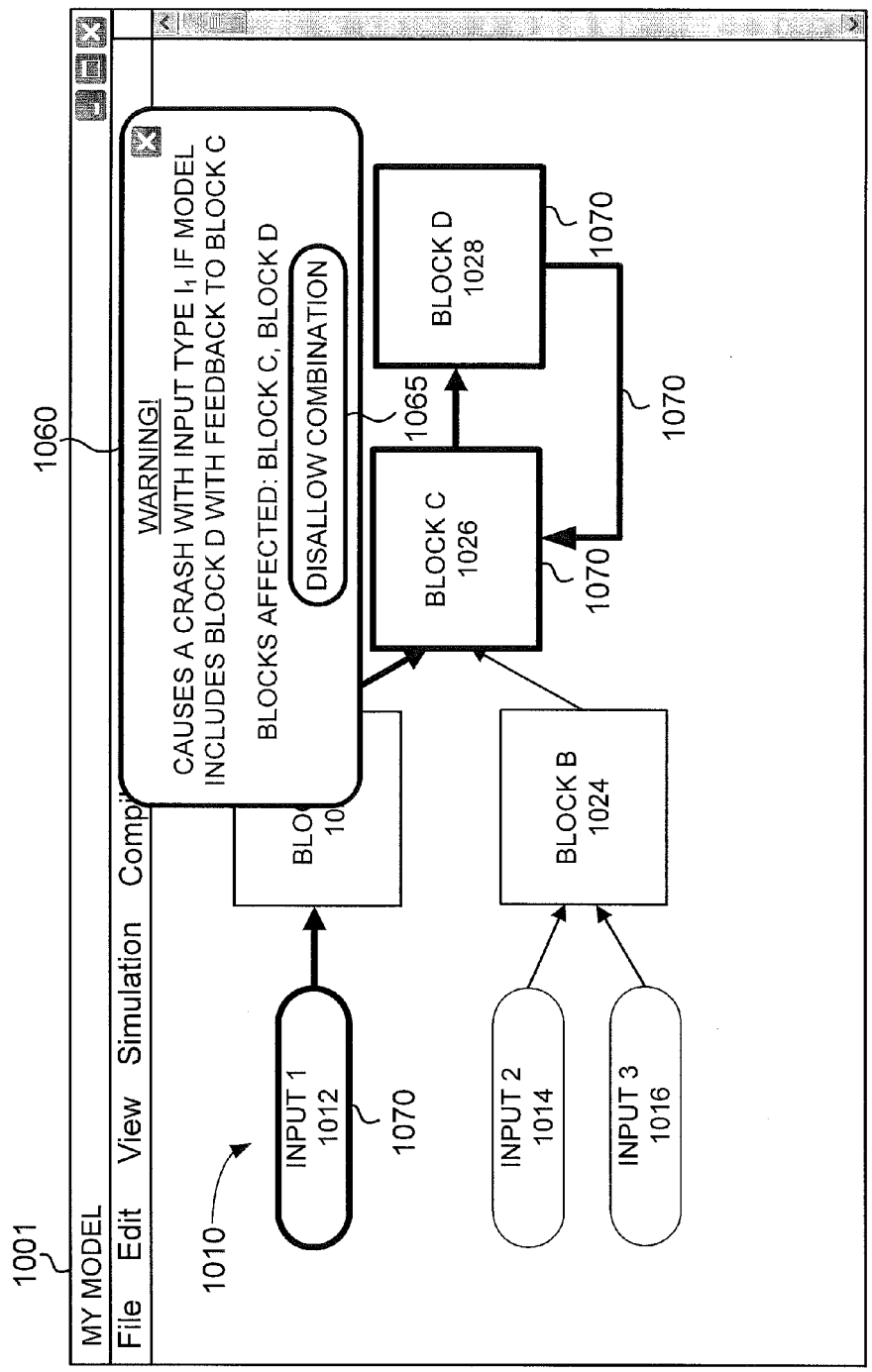
FIG. 10D is a diagram of a second example user interface for presenting a check report according to an implementation described herein.

FIG. 10D is a diagram of example user interface 1001 for presenting an option to disable a particular combination of blocks based on check report 1050. User interface 1001 may include warning box 1060, which warns the user about a serious bug associated with graphical model 1010. Warning box 1060 may include selection tool 1065 to disallow the combination of blocks associated with the bug. Furthermore, the combination of blocks may include an indicator (e.g., by highlighting) 1070.

While FIGS. 10A-10D describe an example where code may be generated through a graphical modeling application, in another example, code, for which a check report regarding relevant bugs may be requested, may be generated using another application that requests a check report from bug reports system 130.

For example, a code writing application may send a request for a check report to bug reports system 130. The code writing application may, for example, enable generation of code by converting expressions in the MATLAB® language, C language, or another programming language, into executable code associated with a same or a different language. For example, an application for writing C programs may be used to generate C code, an application for writing programs in the MATLAB® language may be used to generate MATLAB® language code, an application for writing programs in the MATLAB® language may be used to generate C code, and/or an application for writing programs in the MATLAB® language may be used to generate hardware description language (HDL) code. As another example, a C program or a program in MATLAB® language may be used to generate machine language code. The code writing application may enable optimization configurations to improve speed, memory use, code size, optimizations to take advantage of particular hardware, and/or any other optimization to improve performance of the generated code. The code writing application may, for example, send, to bug reports system 130, information about particular software modules that are to be used in particular code and information about particular optimization configurations associated with the code. Bug report system 130 may identify relevant bug reports based on the information received from the code writing application.

The foregoing description provides illustration and description, but is not intended to be exhaustive or to limit the implementations to the precise form disclosed. Modifications and variations are possible in light of the above teachings or may be acquired from practice of the described implementations.

For example, while series of acts have been described with respect to FIGS. 7-9, the order of the acts may be modified in other implementations. Further, non-dependent acts may be performed in parallel.

Also, certain portions of the implementations may have been described as a "component," "entity," "relation," "unit," "tool," "system," "generator," or "interface" that performs one or more functions. The described "component," "entity," "relation," "unit," "tool," "system," "generator," and "interface" may include hardware, such as a processor, an ASIC, or a FPGA, or a combination of hardware and software (e.g., software running on a processor).

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
    interacting with a memory storing one or more stored bug reports, the interacting being performed by a computer device,
        each stored bug report, of the one or more stored bug reports, containing one or more descriptions, and
        a bug report, of one or more of the stored bug reports, including information associated with a detected software bug,
            the information associated with the detected software bug including information associated with one or more modeling elements, included in a first graphical model of a first system, associated with the detected software bug,
            the detected software bug being associated with a second graphical model of a second system,
                the second graphical model including one or more blocks modeling elements,
                the second graphical model being different than the first graphical model, and
                the second system being different than the first system; and
    determining whether the bug report is relevant to one or more particular bug reports,
        the determining being performed by the computer device, and
        the determining including at least one of:
            comparing the information associated with the detected software bug to the information associated with the one or more modeling elements included in the first graphical model, or
            comparing one or more descriptions of the bug report with the information associated with the one or more modeling elements included in the first graphical model.

2. The method of claim 1, where the information associated with the detected software bug, included in the bug report, includes configuration information associated with the second graphical model.

3. The method of claim 2, where the configuration information associated with the second graphical model includes one or more of:

information identifying a version of a graphical modeling application associated with the second graphical model, or information identifying one or more configuration settings of the graphical modeling application.

4. The method of claim 3, where the information identifying the one or more configuration settings includes one or more of:

information identifying a data type specification associated with the second graphical model, information identifying an optimization specification associated with the second graphical model, information identifying a model simulation specification associated with the second graphical model, information identifying a hardware implementation specification associated with the second graphical model, or information identifying a code generation specification associated with the second graphical model.

5. The method of claim 1, where the determining further includes:

analyzing a description associated with the bug report using a natural language processor; and estimating a likelihood of whether the analyzed description relates to the first graphical model.

6. The method of claim 5, where the determining further includes:

using the estimated likelihood to determine the bug report is relevant to the first graphical model.

7. The method of claim 1, further comprising:

calculating a criticality score for the bug report; and providing the calculated criticality score to another computer device.

8. The method of claim 7, where the providing the calculated criticality score to the other computer device includes:

ranking the bug report with respect to at least one of the one or more stored bug reports based on the calculated criticality score; and providing the ranked bug report with respect to at least one of the one or more stored bug reports to the other computer device.

9. The method of claim 7, where calculating the criticality scores includes:

calculating the criticality score based on one or more of:
a severity rating associated with the detected software bug,
a frequency of occurrence of the detected software bug,
a probability of occurrence of the detected software bug, or
a number of times that the detected software bug has been reported by users.

10. The method of claim 7, where calculating the criticality scores includes:

calculating the criticality score based on one or more of:
information associated with the one or more modeling elements included in the second graphical model,
configuration information associated with the second graphical model, or
information associated with statistics associated with the bug report.

11. The method of claim 1, further comprising:

providing information associated with the bug report, where, when providing the information associated with the bug report, the method includes:
providing information associated with an available fix associated with the bug report.

12. The method of claim 1, further comprising:

providing information identifying a future incompatibility issue associated with the one or more modeling elements included in the first graphical model.

13. The method of claim 1, further comprising:

receiving the bug report from a developer of a particular modeling element available via a graphical modeling application, where the bug report includes information indicating that the software bug is associated with the particular modeling element; and storing the bug report in the memory, where the determining further includes:
determining that the one or more modeling elements included in the first graphical model include the particular modeling element, and
identifying the bug report as a relevant bug report based on the one or more modeling elements including the particular modeling element.

14. The method of claim 1, further comprising:

receiving another bug report from a user, where the other bug report includes information associated with a bug associated with a particular modeling element available via a graphical modeling application; and storing the other bug report in the memory.

15. The method of claim 1, where each stored bug report, of the one or more stored bug reports, further includes one or more of:

information identifying a classification associated with the detected software bug, information identifying a version of a graphical modeling application associated with the detected software bug, a detection script associated with the detected software bug, a description of the detected software bug, or information identifying statistics associated with the detected software bug.

16. The method of claim 15, where the information identifying the statistics associated with the detected software bug includes one or more of:

information identifying a severity rating associated with the detected software bug, information identifying a frequency of occurrence associated with the detected software bug, information identifying a probability of occurrence associated with the detected software bug, or information identifying a quantity of times the detected software bug has been reported by users.

17. A method comprising:

interacting with a memory storing one or more stored bug reports and one or more detection scripts generated for each of at least some of the one or more stored bug reports, a stored bug report, of the at least some of the one or more stored bug reports, including information associated with a software bug associated with a first graphical model of a first system, the information associated with the software bug including information associated with one or more modeling elements, included in a second graphical model of a second system, associated with the software bug, the software bug being detectable by a detection script generated for the stored bug report, the second graphical model including one or more modeling elements, the second graphical model being different than the first graphical model, and
the second system being different than the first system, and
the interacting being performed by a computer device; and
determining whether the stored bug report is relevant to one or more particular bug reports,
the determining being performed by the computer device, and
the determining including:
applying the detection script to the second graphical model to analyze a possible existence of the software bug in the second graphical model.

18. The method of claim 17, further comprising:
generating executable code based on the second graphical model.

19. The method of claim 17, further comprising:
providing information about the stored bug report for display in association with a visual indicator,
where the visual indicator highlights a particular modeling element, of the one or more modeling elements included in the second graphical model, that is associated with the stored bug report.

20. The method of claim 17, further comprising:
producing, based on determining whether the stored bug report is relevant to the one or more particular bug reports, a report,
the report including information associated with a modification to the second graphical model,
the modification being associated with the stored bug report; and
applying the modification to the second graphical model to modify the second graphical model.

21. The method of claim 20, where the report includes information identifying an incompatibility associated with a particular modeling element of the one or more modeling elements included in the second graphical model.

22. The method of claim 17, further comprising:
obtaining configuration information associated with the first graphical model,
where the configuration information includes one or more of:
information identifying a data type specification associated with the first graphical model,
information identifying an optimization specification associated with the first graphical model,
information identifying a model simulation specification associated with the first graphical model,
information identifying a hardware implementation specification associated with the first graphical model, or
information identifying a code generation specification associated with the first graphical model, and
where the stored bug report is determined to be relevant to the one or more particular bug reports based on the configuration information.

23. A computing device, in a technical computing environment, comprising:
a memory to:
store one or more bug reports; and
a processor to:
interact with the memory,
each stored bug report, of the one or more stored bug reports, containing one or more descriptions, and
a bug report, of one or more of the stored bug reports, including information associated with a detected software bug,
the information associated with the detected software bug including information associated with one or more modeling elements, included in a first graphical model of a first system, associated with the detected software bug,
the detected software bug being associated with a second graphical model of a second system,
the second graphical model including one or more modeling elements,
the second graphical model being different than the first graphical model, and
the second system being different than the first system; and
determine whether the bug report is relevant to one or more particular bug reports,
the processor, when determining whether the bug report is relevant to the one or more particular bug reports, is to at least one of:
compare the information associated with the detected software bug to the information associated with the one or more modeling elements included in the first graphical model, or
compare one or more descriptions of the bug report with the information associated with the one or more modeling elements included in the first graphical model.

24. The computing device of claim 23, where the information associated with the detected software bug includes configuration information associated with the second graphical model.

25. The computing device of claim 24, where the configuration information associated with the second graphical model includes one or more of:
information identifying a version of a graphical modeling application associated with the second graphical model,
information identifying a data type specification associated with the second graphical model,
information identifying an optimization specification associated with the second graphical model,
information identifying a model simulation specification associated with the second graphical model,
information identifying a hardware implementation specification associated with the second graphical model, or
information identifying a code generation specification associated with the second graphical model.

26. The computing device of claim 23, where the processor is further to:
calculate a criticality score for the bug report;
rank the bug report with respect to at least one of the one or more stored bug reports based on the calculated criticality score; and
provide the ranked bug report with respect to at least one of the one or more stored bug reports for display to a user.

27. The computing device of claim 26, where, when calculating the criticality score, the processor is to:
calculate the criticality score based on one or more of:
a severity rating associated with the detected software bug,
a frequency of occurrence associated with the detected software bug,
a probability of occurrence associated with the detected software bug,
a quantity of times the detected software bug has been reported by users; or an estimated likelihood that the detected software bug is relevant to the first graphical model,
the likelihood that the detected software bug is relevant to the first graphical model being estimated based on a description of the detected software bug, included in the bug report, that is analyzed using a natural language processor.

28. The computing device of claim 23, where the processor is further to:
receive another bug report from a developer of a particular modeling element,
the particular modeling element being available via a graphical modeling application, and
the other bug report including information about a bug associated with the particular modeling element; and
store the other bug report in the memory based on the particular modeling element being available via the graphical modeling application.

29. The computing device of claim 23, where the processor is further to:
receive another bug report from another user of a graphical modeling application,
where the other bug report includes information about a bug associated with a particular modeling element that is available via the graphical modeling application; and
store the other bug report in the memory based on the particular modeling element being available via the graphical modeling application.

30. The computing device of claim 23, where each stored bug report further includes at least one of:
information identifying a classification associated with a respective software bug,
information identifying a version of a graphical modeling application associated with the detected software bug,
a detection script associated with the detected software bug,
a description of the detected software bug, or
statistics associated with the detected software bug.

31. One or more non-transitory computer-readable media storing instructions, the instructions comprising:
one or more instructions that, when executed by one or more processors of a first computer device, cause the one or more processors to:
interact with a memory storing one or more stored bug reports,
each stored bug report, of the one or more stored bug reports, containing one or more descriptions, and
a bug report, of one or more of the stored bug reports, including information associated with a detected software bug,
the information associated with the detected software bug including information associated with one or more modeling elements, included in a first graphical model of a first system, associated with the detected software bug,
the detected software bug being associated with a second graphical model of a second system, the second graphical model including one or more modeling elements,
the second graphical model being different than the first graphical model, and
the second system being different than the first system; and
determine whether the bug report is relevant to one or more particular bug reports,
the one or more instructions to determine whether the bug report is relevant to the one or more particular bug reports including at least one of:
one or more instructions to compare the information associated with the detected software bug to the information associated with the one or more modeling elements included in the first graphical model; or
one or more instructions to compare one or more descriptions of the bug report with the information associated with the one or more modeling elements included in the first graphical model.

32. The one or more non-transitory computer-readable media of claim 31, where the information associated with the detected software bug includes configuration information associated with the second graphical model.

33. The one or more non-transitory computer-readable media of claim 32, where the configuration information associated with the second graphical model includes one or more of:
information identifying a version of a graphical modeling application;
information identifying a data type specification associated with the second graphical model,
information identifying an optimization specification associated with the second graphical model,
information identifying a model simulation specification associated with the second graphical model,
information identifying a hardware implementation specification associated with the second graphical model, or
information identifying a code generation specification associated with the second graphical model.

34. The one or more non-transitory computer-readable media of claim 31, where the instructions further comprise:
one or more instructions that, when executed by the one or more processors, cause the one or more processors to:
analyze a description associated with the bug report using a natural language processor; and
estimate a likelihood of whether the analyzed description is relevant to the first graphical model based on the information associated with one or more modeling elements included in the second graphical model.

35. The one or more non-transitory computer-readable media of claim 31, where the instructions further comprise:
one or more instructions that, when executed by the one or more processors, cause the one or more processors to:
determine whether the bug report is relevant to the second graphical model based on the one or more descriptions.

36. The one or more non-transitory computer-readable media of claim 31, where the instructions further comprise:
one or more instructions that, when executed by the one or more processors, cause the one or more processors to:
calculate a criticality score for the bug report; and
provide the calculated criticality score to another computer device.

37. The one or more non-transitory computer-readable media of claim 36, where the one or more instructions to provide the calculated criticality score to the other computer device include:
one or more instructions that, when executed by the one or more processors, cause the one or more processors to:
rank the bug report with respect to at least one of the one or more stored bug reports based on the calculated criticality score; and provide the ranked bug report with respect to at least one of the one or more stored bug reports to the other computer device.

38. The one or more non-transitory computer-readable media of claim 36, where the one or more instructions to calculate the criticality score include:
one or more instructions that, when executed by the one or more processors, cause the one or more processors to:
calculate a criticality score based on one or more of:
a severity rating associated with the detected software bug,
a frequency of occurrence of the detected software bug,
a probability of occurrence of the detected software bug,
a quantity of times the detected software bug has been reported by users, or
an estimated likelihood that the detected software bug is relevant to the first graphical model based on information that describes the detected software bug being analyzed using a natural language processor.

39. The one or more non-transitory computer-readable media of claim 31, where the instructions further comprise:
one or more instructions that, when executed by the one or more processors, cause the one or more processors to:
provide information associated with an available fix associated with the bug report to another computer device.

40. The one or more non-transitory computer-readable media of claim 31, where the instructions further comprise:
one or more instructions that, when executed by the one or more processors, cause the one or more processors to:
provide information associated with a future incompatibility associated with the one or more modeling elements included in the first graphical model.

41. The one or more non-transitory computer-readable media of claim 31, where the one or more instructions to determine whether the bug report is relevant to the one or more particular bug reports include:
one or more instructions that, when executed by the one or more processors, cause the one or more processors to:
determine that the bug report is relevant to the one or more particular bug reports when statistics associated with the on bug report satisfy a particular rule.

42. The one or more non-transitory computer-readable media of claim 41, where the particular rule relates one or more threshold values to at least one of:
a severity rating associated with the detected software bug,
a frequency of occurrence of the detected software bug,
a probability of occurrence of the detected software bug,
a quantity of times the detected software bug has been reported by users, or
an estimated likelihood that the detected software bug is relevant to the first graphical model based on analyzing the information that describes the detected software bug using a natural language processor.

43. The one or more non-transitory computer-readable media of claim 31, where the instructions further comprise:
one or more instructions that, when executed by the one or more processors, cause the one or more processors to:
modify, based on the bug report, a graphical modeling application, associated with the first graphical model, to disallow one or more of:
a modeling element,
a particular combination of modeling elements,
a parameter associated with a modeling element, or
a particular configuration of the graphical modeling application.

44. The one or more non-transitory computer-readable media of claim 31, where the instructions further comprise:
one or more instructions that, when executed by the one or more processors, cause the one or more processors to:
modify a graphical modeling application, associated with the first graphical model, to disallow a generation of code affected by the detected software bug.

45. One or more non-transitory computer-readable media storing instructions, the instructions comprising:
one or more instructions that, when executed by one or more processors of a first computer device, cause the one or more processors to:
interact with a memory storing one or more stored bug reports and one or more detection scripts generated for each of at least some of the one or more stored bug reports,
a stored bug report, of the at least some of the one or more stored bug reports, including information associated with a software bug associated with a first graphical model of a first system,
the information associated with the software bug including information associated with one or more modeling elements, included in a second graphical model of a second system, associated with the software bug,
the second graphical model including one or more modeling elements,
the second graphical model being different than the first graphical model, and
the second system being different than the first system, and
the software bug being detectable by a detection script generated for the stored bug report; and
determine whether the stored bug report is relevant to one or more particular bug reports:
the one or more instructions to determine whether the bug report is relevant to the one or more particular bug reports including:
one or more instructions to apply the detection script to the second graphical model to analyze a possible existence of the software bug in the second graphical model.

46. The one or more non-transitory computer-readable media of claim 45, where the instructions further comprise:
one or more instructions that, when executed by the one or more processors, cause the one or more processors to:
generate, based on a check report associated with the stored bug report, executable code for executing the second graphical model.

47. The one or more non-transitory computer-readable media of claim 46, where the one or more instructions to generate the executable code include:
one or more instructions that, when executed by the one or more processors, cause the one or more processors to:
modify a graphical modeling application to disallow a generation of code affected by the detected software bug; and
generate the executable code based on modifying the graphical modeling application.

48. The one or more non-transitory computer-readable media of claim 45, where the instructions further comprise:
one or more instructions that, when executed by the one or more processors, cause the one or more processors to:
provide information included in the stored bug report in association with a visual indicator, where the visual indicator indicates a particular modeling element, of the one or more modeling elements included in the second graphical model, that is associated with the stored bug report; and
enable a selection to disallow a use of the particular modeling element in the second graphical model.

49. The one or more non-transitory computer-readable media of claim 45, where
a check report, associated with the stored bug report, includes information identifying a fix associated with the stored bug report, and
the instructions further comprise:
one or more instructions that, when executed by the one or more processors, cause the one or more processors to:
apply the fix to the second graphical model to modify the second graphical model.

50. The one or more non-transitory computer-readable media of claim 45, where a check report, associated with the stored bug report, includes information identifying an incompatibility issue associated with a particular modeling element of the one or more modeling elements included in the second graphical model.

51. The one or more non-transitory computer-readable media of claim 45, where
the first graphical model includes configuration information,
the configuration information including one or more of:
information identifying a version of a graphical modeling application associated with the first graphical model;
information identifying a data type specification associated with the first graphical model,
information identifying an optimization specification associated with the first graphical model,
information identifying a model simulation specification associated with the first graphical model,
information identifying a hardware implementation specification associated with the first graphical model, or
information identifying a code generation specification associated with the first graphical model.

\* \* \* \* \*